United States Patent [19]
Otsuka et al.

[11] Patent Number: 5,856,281
[45] Date of Patent: Jan. 5, 1999

[54] BEARING AND MANUFACTURING METHOD OF BEARING, AND MAGNETIC DISK DEVICE WITH BEARING CONTAINING A LUBRICATING GREASE

[75] Inventors: Masaki Otsuka, Odawara; Iwao Matsuyama, Sagamihara; Mitsuhiko Oguchi, Ebina; Kazuhisa Murakami, Hiratsuka; Nobuyuki Ishii, Odawara; Masayuki Katsumoto, Kodaira; Tsuneyuki Hasegawa, Odawara; Satomi Yamaguchi, Hiratsuka, all of Japan

[73] Assignee: Hitachi, Ltd., Tokyo, Japan

[21] Appl. No.: 768,537

[22] Filed: Dec. 18, 1996

[30] Foreign Application Priority Data

Dec. 19, 1995 [JP] Japan ..................................... 7-330655

[51] Int. Cl.$^6$ ................................. C10M 169/06
[52] U.S. Cl. .......................... 508/552; 508/136; 508/536; 508/537; 508/539; 390/97.01; 390/99.08; 310/90
[58] Field of Search ..................................... 508/552, 136, 508/536, 537, 539; 390/97.01, 99.08; 310/90

[56] References Cited

U.S. PATENT DOCUMENTS

| | | | |
|---|---|---|---|
| 3,920,571 | 11/1975 | Crocker | 252/25 |
| 5,059,336 | 10/1991 | Naka et al. | 252/33.3 |
| 5,214,326 | 5/1993 | Yonei | 310/67 R |
| 5,281,886 | 1/1994 | Ohta | 310/90 |
| 5,373,407 | 12/1994 | Stupak, Jr. et al. | 360/99.08 |
| 5,462,684 | 10/1995 | Naka et al. | 252/51.5 R |
| 5,491,596 | 2/1996 | Kobori | 360/97.03 |
| 5,600,514 | 2/1997 | Fukuzawa | 360/99.08 |

FOREIGN PATENT DOCUMENTS

| | | |
|---|---|---|
| 5-62450 | 12/1993 | Japan . |
| 6-036546 | 10/1994 | Japan . |

*Primary Examiner*—Jerry D. Johnson
*Attorney, Agent, or Firm*—Fay,Sharpe,Beall,Fagan,Minnich & McKee

[57] ABSTRACT

Gas contaminants generated from the grease of bearings operating in a magnetic disk device adhere to the magnetic head and causing stiction and magnetic head crash. Such bearings are typically spindle bearings and pivot bearings. In operation, heat is generated that causes the bearing grease to generate the gases. By heat treating the grease, slow evaporating substances of hydrocarbon compounds with carbons of C9 to C13 in the grease are reduced to not more than 0.001 wt. % of the grease. The grease can then be used to lubricate the bearings. The heat treatment is performed at a temperature of 60° to 100° C. at a pressure of $10^{-3}$ to $10^{-8}$ torr. The assembled, lubricated bearings can be heat treated separately from the magnetic disk device or the heat treatment can take place after the bearings have been assembled in the magnetic disk device.

8 Claims, 6 Drawing Sheets

BEARING AND MANUFACTURING METHOD OF BEARING, AND MAGNETIC DISK DEVICE WITH BEARING CONTAINING A LUBRICATING GREASE

FIELD OF THE INVENTION

The present invention is related to bearings, and in particular to a method of manufacturing bearings or treating manufactured bearings used in a device, such as a magnetic disk device, for example, that can be detrimentally affected by an environment of organic gases generated by a bearing lubricant according to the invention.

BACKGROUND OF THE INVENTION

Generally, in a magnetic disk device, the magnetic head floats above the surface of the magnetic disk when it is rotating at high speed. A very small space or floating height between the magnetic head and the disk is created by the viscous air flow. Recording and retrieving of data is accomplished when the head is floating over the surface of the magnetic disk.

The recording density of the magnetic disk device is inversely proportional to the floating height of the magnetic head above the surface of the magnetic disk. It has been the tendency to decrease the floating height, and recently the floating height has reached the level of 50 nm. To comply with the requirement for a lower floating height, a sputtering disk has been used as the magnetic disk in a magnetic disk device.

A sputtering disk is formed by sputtering a magnetic material layer in forming the magnetic disk. The flatness of a magnetic disk is defined, for example, by its average surface roughness Ra. For a sputtering disk, an average surface roughness Ra of 20 to 5 nm has been achieved, making the sputtering disk advantageous in the objective of decreasing the floating height of the magnetic head.

Also, to comply with the requirements for a low floating height magnetic head, a negative pressure type magnetic head slider has been used wherein negative air pressure is introduced. Incoming air flow at the leading edge of the magnetic head slider is compressed, then released at a groove part to thereby generate the negative pressure (below atmospheric pressure condition). This creates a negative air pressure force that keeps the floating height constant between the inner circumference and outer circumference of the magnetic disk, despite the differences in surface linear speed therebetween.

As a result of recent advances in magnetic disk devices that are directed toward lowering the floating height of the magnetic head with respect to the magnetic disk, the following problems have occurred.

In a magnetic disk device, dust, fine oil mist and/or organic gases generated from the bearings and other lubricated, moving parts mix with the air inside the device. These contaminants float in the air within the device and until now have not caused any problem because the floating height between the magnetic head and the disk has not been so narrow as it is with recently developed magnetic disk devices. Now, since the floating height is significantly decreased, the contaminants generated from the bearings, among others, have the possibility of being lodged in the narrow space between the magnetic head and the magnetic disk causing magnetic head crash and damage to the magnetic head and the magnetic disk.

During the operation of the device, the contaminants floating in the air, especially the oil mist and the organic gases, adhere to the magnetic head slider. As a result, stiction between the head slider and the magnetic disk results. This can prevent rotation of the magnetic disk, which leads to the possibility of starting failure of the magnetic disk device due to the available starting torque. Also, there is a possibility that the magnetic disk can be damaged due to stiction caused by flaking off on the surface of the magnetic disk where the head slider adheres to the disk. This can be caused when a force larger than the normal starting torque is used to start rotation of the magnetic disk.

In magnetic disk devices of the prior art, it has been proposed that an electrostatic filter be used to collect floating contaminants in the air of a magnetic disk device. This proposal has been made in Japanese Application No. 5-62450. In another proposal, disclosed by Japanese Patent Application No. 6-36546, a filter is used in an air flow path arranged between a part near the rotating shaft of the carriage that drives the magnetic head and a part near the magnetic disk. The filter in the air flow path is intended to collect oil mist to prevent the oil mist from contaminating the air space within the device.

It has also been proposed in the prior art to provide a magnetic disk device having an enclosed air space with an outer circulating path. The air that flows through an inner part of the air space is passed through a filter to the outer circulation path to trap organic gases. Thereafter, the air in the outer circulation path that has been filtered is returned to the inner air space, or the interior of the device where the magnetic disk is present.

SUMMARY OF THE INVENTION

A magnetic disk device constructed according to the aforementioned prior art and having, for example, an electrostatic filter can remove comparatively large contaminants, such as dust or oil mist, but cannot completely remove the organic gases generated by the lubricated bearings operating at a high temperature. In particular, the bearings which support the rotational movement of the actuator (pivot bearing) and the bearings that support the high speed rotation of the magnetic disks generate high temperatures that heat the lubricant used in the bearings, which produces organic gas that contaminate the air inside the magnetic disk device. As a result, head crash and stiction problems occur with the aforementioned prior art magnetic disk devices.

With the prior art magnetic disk devices, the problems of magnetic disk damage and starting failure occur as a result of the contaminants existing in the disk device, such as the aforementioned organic gases that are generated by the bearings. To equip a magnetic disk device with a filter sufficient to trap the organic gases requires increasing the size of the magnetic disk device. Alternatively stated, it is difficult to minimize the size of the magnetic disk device and include the required filter for trapping such contaminants as organic gases. In particular, the filters provided for the aforementioned prior art magnetic disk devices may be capable of trapping generated organic gases, but the problems associated with the generation of these gases by the high temperature operation of the bearings, which are lubricated with a grease, cannot be prevented.

It is an object of the present invention to overcome the drawbacks with the prior art by providing bearings that prevent the generation of organic gases, by providing a manufacturing method for manufacturing bearings of a treating method for creating manufactured bearings that prevents organic gases from being generated by the bearings, and by providing a magnetic disk device that uses such bearings that prevent the generation of organic gases.

By the present invention, the object of providing a magnetic disk device that prevents the generation of organic gases inside the device is achieved, so magnetic head crash and stiction due to the presence of the organic gases is prevented. These objects are achieved by manufacturing or treating methods used in the manufacture of the bearings for magnetic disk devices.

Roller bearings and spindle bearings are examples of bearings found in magnetic disk devices, however the invention is applicable to all types of bearings that are applied with grease that generate organic gases. The organic gases are generally thought to be generated by the heat produced during operation of the bearings. This heat causes slow evaporation of the hydrocarbon compounds in the lubricant or grease used in the bearings.

As a typical arrangement of a bearing, rollers are held between an inner ring and an outer ring so that the outer ring rotates freely with respect to the inner ring or vice versa. The rollers are applied with grease to ensure smooth rotation of the rollers with respect to the rings, and the grease is generally comprised of a thickener, lubricant and additives.

According to a first feature of the present invention, the slowly evaporating substances of the thickener and additives of the grease used in roller bearings or spindle bearings in a magnetic disk device, for example, is significantly reduced and preferably eliminated. Specifically, the slow evaporating substances that are reduced or eliminated have hydrocarbon compounds with carbons of C9 to C13 carbon, as identified by gas chromotography-mass spectroscopy analysis, for example.

According to a second feature of the present invention, the grease comprises a base oil as the liquid lubricant in addition to a thickener and an additive, and the slow evaporating substance is significantly reduced or eliminated from the grease used for the bearings.

In a third feature of the invention, bearings are manufactured with a grease having a thickener, base oil and additives wherein the greased bearings are treated by heating at a temperature of 60° to 100° C. to significantly reduce or eliminate the slow evaporating substances having a major content of hydrocarbon compounds with carbons of C9 to C13.

According to a fourth feature of the present invention, the grease has a base oil as the lubricant, a thickener and additives and is applied to the bearings used in a magnetic disk device. After assembly of the bearings, the bearings are treated in a vacuum at a pressure of $10^{-6}$ torr and then treated at a temperature of 60° to 80° C. to significantly reduce and preferably eliminate the slow evaporating substances.

According to a fifth feature of the present invention, a magnetic disk device is provided that has bearings including spindle bearings that support the magnetic disk(s) in high speed rotation and a pivot bearing that supports the actuator arm to which the magnetic head is attached for rotation, wherein the bearings in the magnetic disk device are lubricated by a grease in which the slow evaporating substances have been significantly reduced or eliminated.

DETAILED DESCRIPTION OF THE PREFERRED EMBODIMENTS

The preferred embodiment of the grease for lubricating the bearings, the lubricated bearings, the method of manufacturing the bearings, and the magnetic disc device having the bearings of the present invention are described in detail in the drawings.

Figure 5:
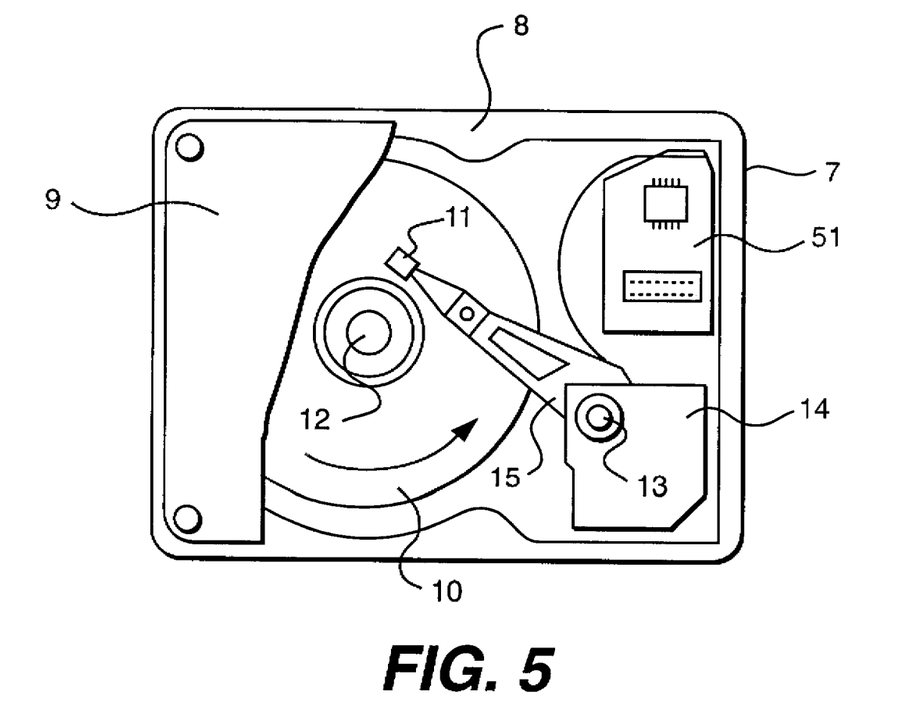
FIG. 5 illustrates a configuration of a magnetic disk device.

A magnetic disk device is illustrated in FIG. 5 and comprises a magnetic disk 10, a spindle assembly 12 that drives the magnetic disk, a magnetic head 11 that stores and retrieves data to/from the magnetic disk 10, a carriage 15 that rotates for supporting the magnetic head 11 and an actuator 14 that drives the carriage 15 about an axis of rotation on a pivot bearing 13. A circuit board 51 is mounted in the disk unit and is provided with an electric circuit that controls the movement of these components and also generally controls the data storage and retrieval. A base 8 that supports the mechanism and the circuit board is provided with a cover 9 that covers the components of the disk device in an airtight manner. Generally, such an arrangement containing magnetic head(s), magnetic disk(s) and drive mechanism(s) for the disk(s) and the head(s) in an airtight unit is known as an HDA (head disk assembly).

Figure 6:
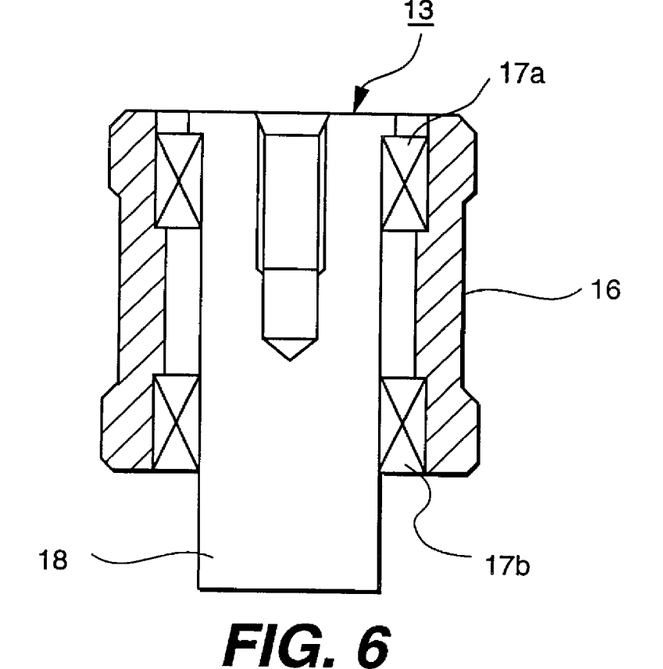
FIG. 6 illustrates a cross section of a pivot bearing of the magnetic head actuator.

The above described pivot bearing 13, shown partially in cross section in FIG. 6, comprises a shaft 18 that is fixed to the base 8. As shown, cylindrical bearings 17a and 17b have inner sides which fit the upper and lower parts of the circumference of the spindle 18. Bearings 17a and 17b have outer sides which fit a hub 16. Accordingly, hub 16 rotates with a center of rotation being about the shaft 18.

Figure 4:
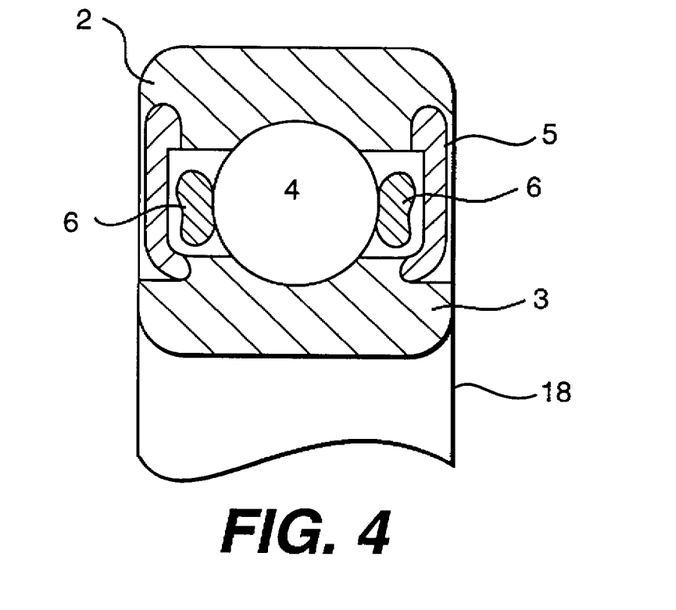
FIG. 4 illustrates a partial cross section of a bearing constructed according to a preferred embodiment.

The bearings 17a and 17b comprise, as is illustrated by the enlarged drawing of FIG. 4, an outer ring 2 and an inner ring 3 as well as a rolling body (ball bearings) 4 that enables relative rotation between inner ring 3 and outer ring 2. Lubrication of the bearings is provided by grease 6 that enables the rolling body 4 to rotate smoothly. Seals 5 provide a seal between the inner and outer rings to prevent the scattering of the grease 6 as the outer ring 2 rotates with respect to the inner ring 3 by the rotation (rolling) of rolling body 4. The rolling body 4 is a spherical ball bearing and decreases friction and wear of the bearing by being lubricated with grease 6.

Figure 7:
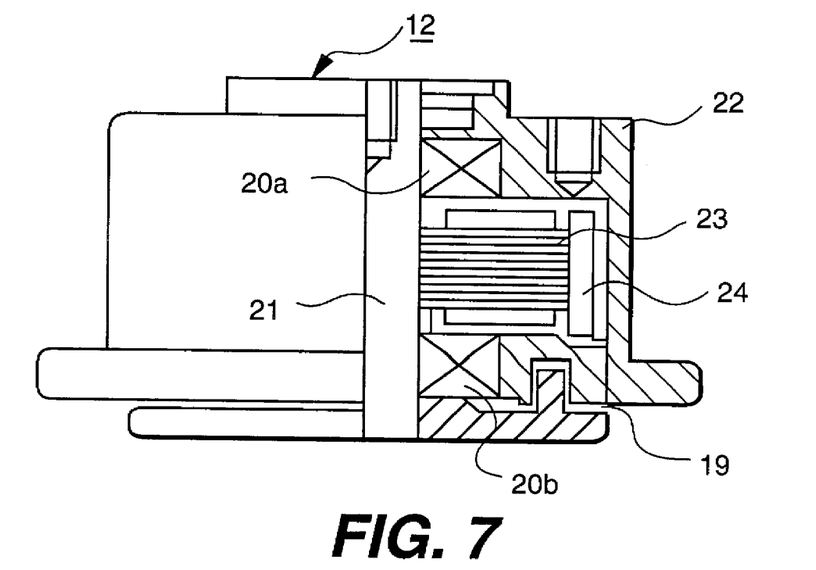
FIG. 7 illustrates a cross section of a spindle motor that rotates the magnetic disk.

The spindle assembly 12 comprises, as shown in partial cross section in FIG. 7, a shaft 21 that is fixed to a base and an electric magnet 23 fixed to the middle position of the shaft 21. Spindle bearings 20a and 20b each have an inner side fit onto the shaft 21. A spindle hub 22 is fit on the outer side of the bearings 20a and 20b, and a magnet 24 is arranged at a position facing electric magnet 23. A labyrinth structure 19 is provided to prevent the scattering of the mist of the grease arranged near spindle bearing 20b. Spindle hub 22 rotates with the support of spindle bearings 20a and 20b at high speed by the mutual magnetic effect of the electric magnets 23 and 24. Although not illustrated, the magnetic disk is engaged to the outer circumference of the spindle hub 22. FIG. 7 illustrates only the right half side of the spindle assembly 12, however it is understood that the other side of the spindle assembly 12 is similar in structure.

In the magnetic disk device that is the subject of the preferred embodiment of the present invention, the bearings 17a, 17b, 20a and 20b are provided for the spindle hub 22 and a pivot bearing 13 is provided to support the rotor. A grease is used as the lubricant and is sealed between the inner and outer rings of the bearings.

The grease is generally for preventing seizure of the bearings by decreasing friction and wear. The grease has a characteristic that when force is applied to the bearings, the grease provides a lubricating effect by increasing its fluidity and when the force is removed it loses the fluidity. Generally, grease can be classified according to common compositions each including a lubricant, a thickener and at least one additive, briefly described as follows.

Cup grease includes mineral oil as the lubricant, calcium soap as a thickener and water of 1–2%, and has good water-resistance.

Fiber grease includes mineral oil as the lubricant and sodium soap as the thickener, and is suitable for bearings operating at high temperature or high speed.

Aluminum grease, also called mobile grease, includes mineral oil as the lubricant and aluminum soap as the thickener, has water-resistance and stickiness, and has the tendency to gel during prolonged use at high temperature.

Barium and lithium greases are considered to be multi-purpose greases, and are comprised as follows.

Barium grease comprises mineral oil as the lubricant and barium soap as the thickener, and also a soap of excessive alkaline or lower fatty acid is added. It has good heat-resistance and water resistance but is poor in mechanical stability.

Lithium grease comprises mineral oil as the lubricant and lithium soap as the thickener, and has good heat-resistance and water-resistance.

Complex greases are of the type having mineral oil as the lubricant and 2 kinds or more of a metallic soap or the metallic soap of molecules to which two kinds of fatty acid are bonded as the thickener. Examples of this group are sodium-calcium grease, aluminum-sodium grease, lithium-calcium grease, lithium-sodium grease and lithium-calcium-sodium grease.

Non-soap based greases have inorganic or organic thickeners, other than a metallic soap. As the inorganic thickener, nonabrasive silica gel and bentonite of which surfaces are treated by surface activator and as the organic thickener copper phthalocyanine, allylurea and terephthalate are used. The melting point of this grease is very high and it has the characteristic of not decomposing at relatively high temperatures.

Graphite grease has a composition of which 0.5 to 1.0% of graphite is added to a cup grease, a fiber grease or a calcium-sodium complex grease.

Extreme pressure greases have an extreme pressure additive, such as lead soap. Sulfur, chlorine and phosphoric acid are also used.

As described above, grease used for bearings comprises a fluid lubricant (mineral oil, for example), a thickener and at least one additive. Included in these are slow evaporating substances of hydrocarbon components that slowly evaporate from the bearings inside the magnetic disk device, by the heat generated inside the device. The slow evaporating substances generate hydrocarbon compounds with carbons of C9 to C13 that float as a gas in the device and thereby cause the possibility of head stiction and resulting magnetic head crash or starting failure of the disk.

The grease and the bearings by the preferred embodiment of the present invention are structured and manufactured as follows.

The grease and method of manufacture:

The grease used for the bearings of the preferred embodiment of the present invention and the method of manufacturing the bearings using such a grease are explained as follows.

(1) The invention includes making a grease by selecting as the lubricant a fluid mineral base oil, a thickener and at least one additive, wherein these ingredients do not include the slow evaporating substances of hydrocarbon compounds with carbons of C9 to C13. If such lubricant, thickener and additive(s) are available, then the grease is mixed using these ingredients. Such ingredients can be obtained by subjecting them to the heat treatment of the present invention.

(2) According to the preferred embodiment of the present invention, a grease is made by mixing and dispersing the lubricant (base oil of mineral oil), the thickener and the additives together and then heating the grease to a temperature of 60° to 100° C. in a baking process to significantly reduce or remove (to a level of less than 0.001% by weight of the total weight of the grease) the slow evaporating substances that generate gases having hydrocarbon compounds with carbons of C9 to C13.

(3) It is further preferred that after mixing and dispersing the lubricant (base oil of mineral oil), the thickener and the additives, the ambient pressure is reduced to $10^{-6}$ torr and the grease is heated to the temperature of 60° to 80° C. in a baking process to significantly reduce or remove (to a level of less than 0.001% by weight of the total weight of the grease) the hydrocarbon compounds with carbons of C9 to C13.

The invention is also directed to manufacturing bearings to be used in a device that is affected by contamination of an environment of organic gases, such as a magnetic disk device. Further, the invention is directed to a device, such as a magnetic disk device that uses bearings and manufacturing the device using the bearings. In particular, the bearings are lubricated with a grease like that described in the preceding numbered paragraphs (1)–(3). Alternatively, the bearings, such as the spindle bearings or pivot bearings are assembled and lubricated with a grease that still contains the slow evaporating substances, whereupon the assembled, lubricated bearings are:

(1) Heated to a temperature of 60° to 100° C. to remove the slow evaporating substances of hydrocarbon compounds having carbons of C9 to C13; or (2) Heated to a temperature of 60° to 80° C. in a chamber at a pressure of $10^{-6}$ torr to remove the slow evaporating substances of hydrocarbons with carbons of C9 to C13.

As set forth in the immediately foregoing two examples, the bearings are assembled, lubricated, sealed and then heat treated to attain the objective of significantly reducing or eliminating the slow evaporating substances that generate gases of hydrocarbon compounds with carbons of C9 to C13.

Although the foregoing discussion of embodiments of the invention sets forth that the grease itself can be treated to remove the slow evaporating substances or the bearings can be assembled, lubricated and then treated to remove the slow evaporating substances from the bearings, it is further contemplated within the scope of the invention that a device, such as a magnetic disk device, that uses bearings, such as spindle bearings and pivot bearings in the device, can be assembled with bearings that are lubricated with a grease still having the slow evaporating substances. In the event that such a device is assembled with bearings having the slow evaporating substances, the device is then:

(1) Heated to a temperature of 60° to 100° C. to remove the slow evaporating substances of hydrocarbon compounds having carbons of C9 to C13; or (2) Heated to a temperature of 60° to 80° C. in a chamber at a pressure of $10^{-6}$ torr to remove the slow evaporating substances of hydrocarbons with carbons of C9 to C13.

Although many different types of greases are set forth, and each comprises a lubricant, a thickener and at least one additive, the preferred embodiment of the invention includes the use of a urea thickener grease and a lithium grease. The urea thickener grease uses mineral oil as a lubricant, urea as the thickener and an antioxidant as the additive. The lithium grease uses mineral oil as a lubricant and an antioxidant as the additive, but the thickener is a lithium soap. Each of these greases is suitable in the practice of the present invention.

Although the foregoing embodiments set forth that the heat treating process can be conducted in a vacuum of $10^{-6}$ torr, it is understood that a vacuum of $10^{-3}$ to $10^{-8}$ torr can be used with the understanding that the greater the vacuum, the faster the process of driving out the slow evaporating substances. Accordingly, the heat treatment process can be conducted at ambient pressure, as set forth in the foregoing examples, but preferably, the pressure is maintained at about $10^{-6}$ torr during the heat treatment.

These and other aspects of the preferred embodiments of the invention can be understood from the following discussion of the analysis of a mineral oil based grease having a urea thickener. The commercial name of the grease used for the following analysis is NIG-ACE WS purchased from Nippon Grease Co., Ltd. Another example of a suitable grease for use with the present invention is DOLIUM R, available from Showa Shell Sekiyu Co., Ltd. Both of these greases are urea thickener greases.

Figure 1:
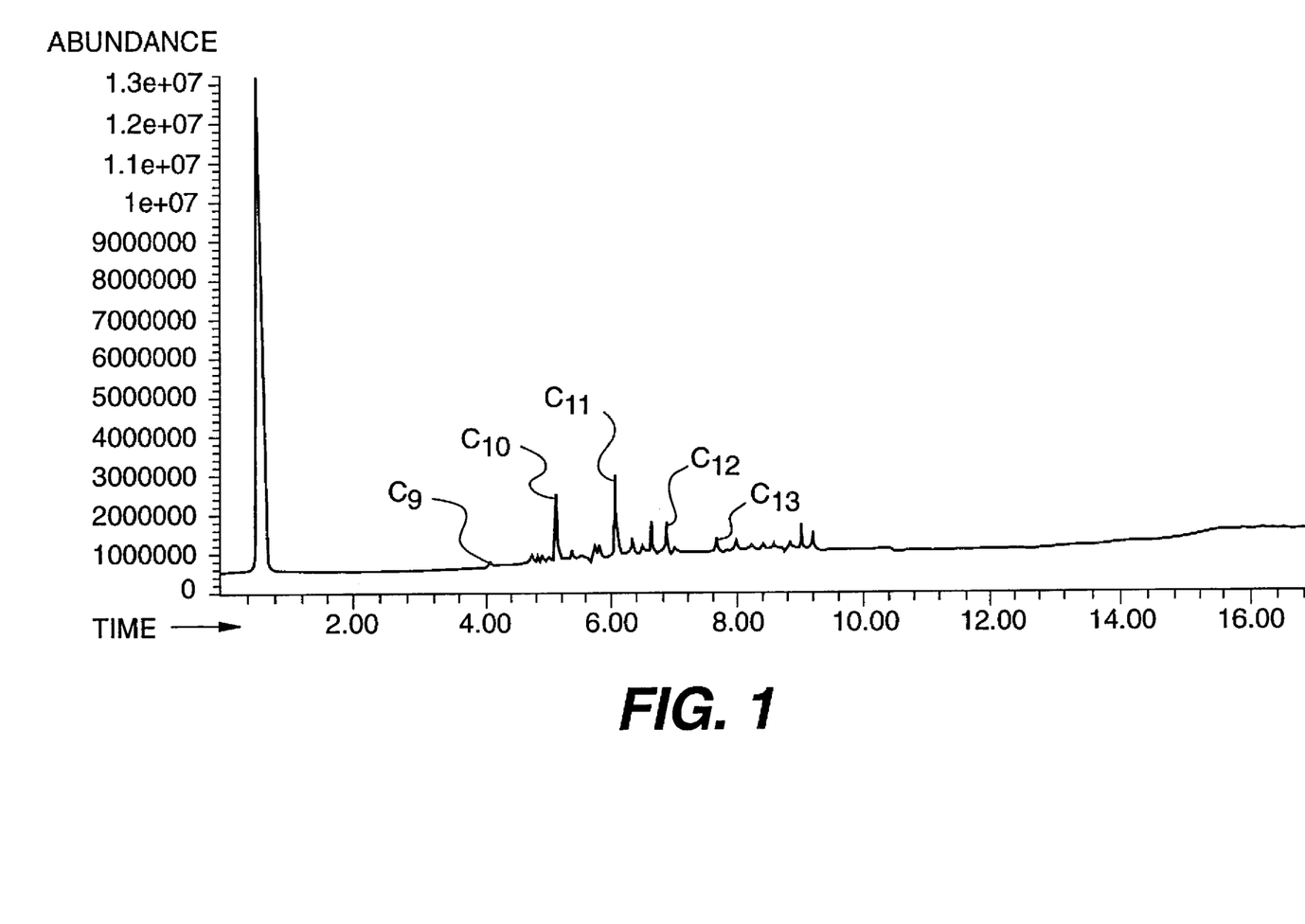
FIG. 1 illustrates the result of the analysis of the content of the gas in the prior art.
Figure 2:
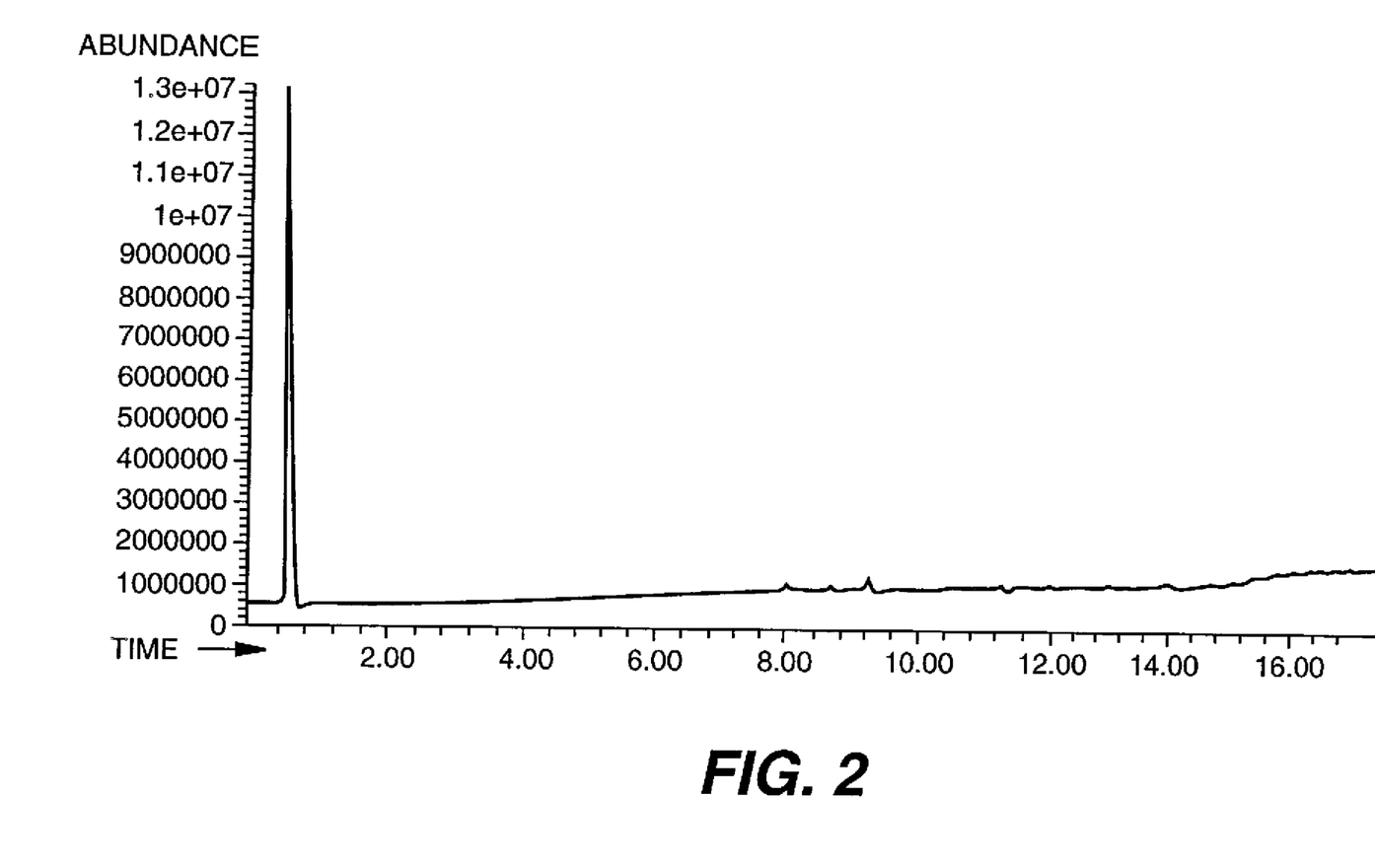
FIG. 2 illustrates the result of the analysis of the content of the gas in the preferred embodiment (at 60°).
Figure 3:
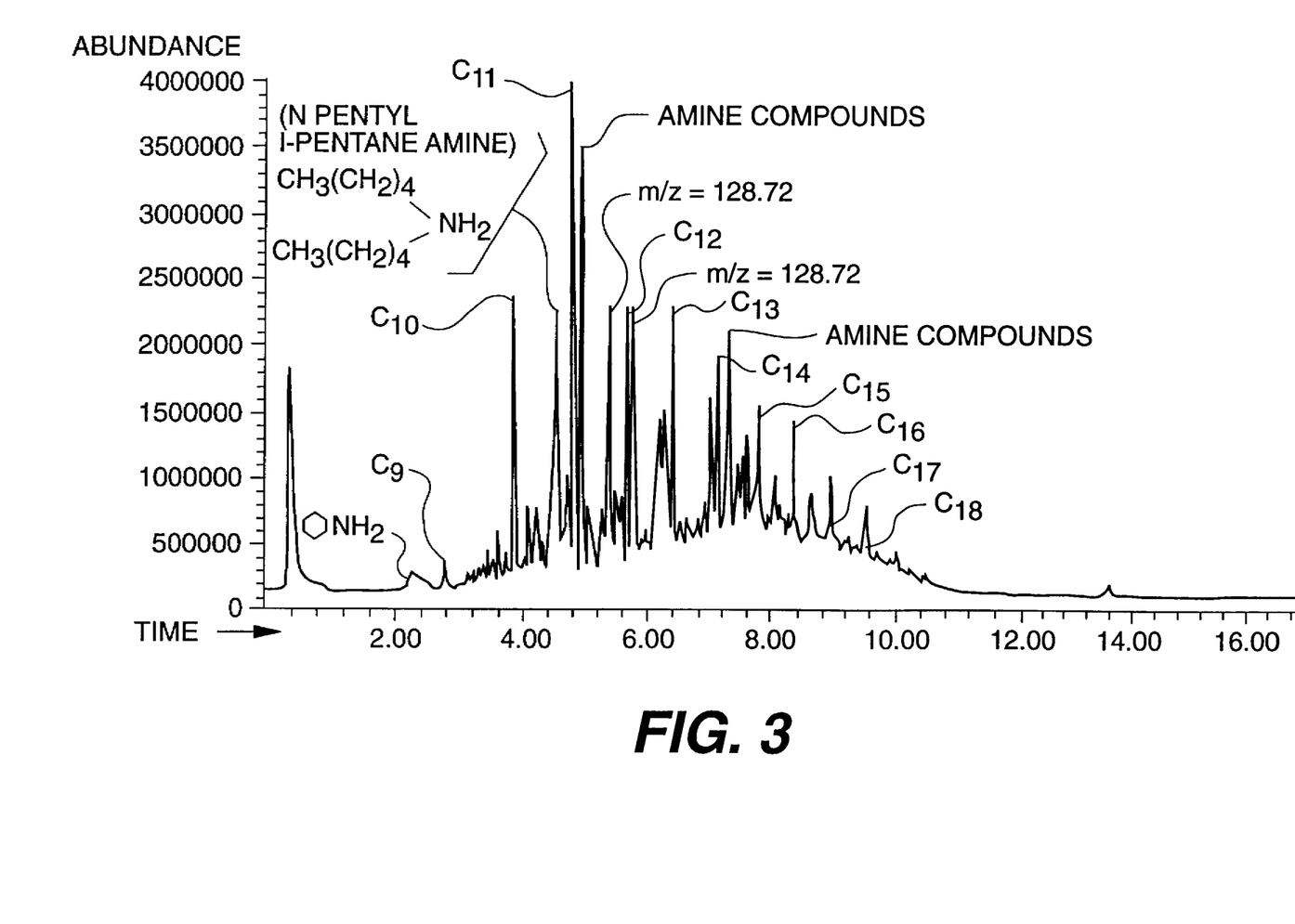
FIG. 3 illustrates the result of the analysis of general grease.

FIGS. 1–3 are diagrams based on the printed output of a gas chromatography-mass spectroscopy analyzer, hereafter a GC-MS.

FIG. 3 is a diagram of the results of an analysis of the urea thickener grease (NIG-ACE WS) after spreading several tens of mg of the grease in a test tube that was placed inside a GC-MS for the analysis of the grease. The grease was heated to a temperature of 120° C. for 10 min. The results of the analysis show that the grease contains many hydrocarbon compounds with carbons of C9 to C18. These hydrocarbon compounds are contained in the mineral oil.

FIG. 1 illustrates the result of the analysis of the same urea thickener grease (NIG-ACE WS) by GC-MS after heating it to 60° C., which is a typical operating temperature for the interior of a magnetic disk device, for 10 min. Referring to this figure, it is understood that there is a conspicuous peak for the organic gases of hydrocarbon compounds with carbons of C9 to C13. It is evident that these organic gases would be generated in a magnetic disk device.

The results of the analysis of the grease shown in FIG. 1 are not the same for a grease that has been heat treated according to the present invention. In accordance with the invention and with reference to FIG. 2, the grease was heat treated inside a vacuum chamber at a temperature of 80° C. and at vacuum of $10^{-6}$ Torr for 2 hr. and 30 min. After the heat treatment, for comparison with the results of FIG. 1, the grease was heated at a temperature of 60° C. for 10 min. The GC-MS analysis results are shown in FIG. 2. The generation of organic gases from hydrocarbon compounds with carbons of C9 to C13 was prevented after the heat treatment, according to the results shown in FIG. 2.

Whereas the GC-MS analysis results of FIG. 1 show that the urea thickener grease, NIG-ACE WS, has hydrocarbon compounds with carbons of C9 to C13, the analysis results of FIG. 2 show that these compounds have been significantly reduced or eliminated. That is, the presence of these compounds was found to be less than 0.001% by weight of the grease, i.e. substantially undetected by the GC-MS analyzer, which has a sensitivity of 100 ng for the decane (C10H22).

As shown by the GC-MS analysis results of FIG. 3, the urea thickener grease contains many hydrocarbon compounds, many of which are essential for the lubricating function of the grease. By the present invention, the heat treatment is performed within a temperature range, preferably between 60° to 80° C., that does not evaporate the hydrocarbon compounds from the grease that are essential for the grease to function as a lubricant for the bearings. Rather, the heat treatment is performed at a temperature typically found inside a magnetic disk device (60° to 80° C.). Consequently, when a magnetic disk device operates at its normal temperature and has bearings lubricated by grease that has been treated as set forth in the present invention or when a magnetic disk device has bearings that are manufactured according to the present invention, the normal operating temperature inside the magnetic disk device will not cause generation of organic gases of hydrocarbon compounds with carbons of C9 to C13, which are detrimental to the operation of the device.

Figure 8:
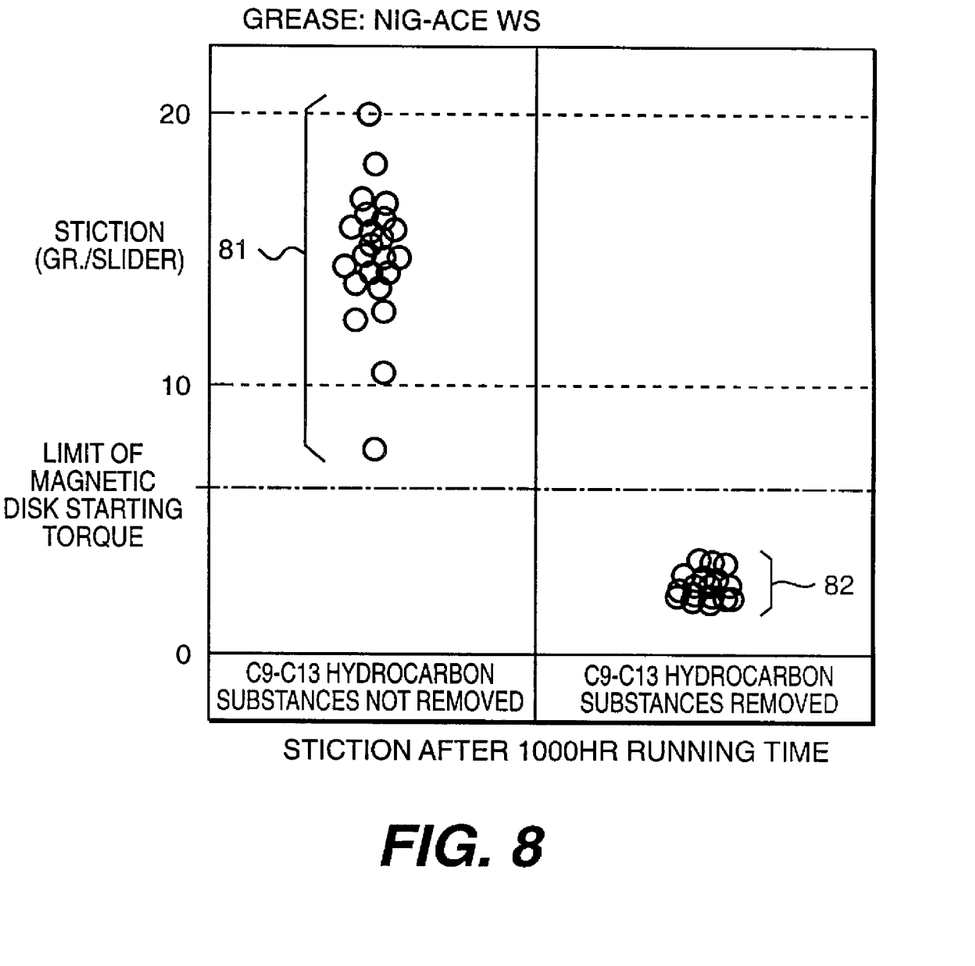
FIG. 8 illustrates the effect of the invention applied to the magnetic disk device in the preferred embodiment.

Also for purposes of comparison, the difference in stiction of the magnetic head and the magnetic disk for magnetic disk devices benefiting from the heat treated bearings (hereafter the present bearings) and the bearings that are not heat treated according to the present invention (hereafter the prior art bearings) is explained referring to FIG. 8.

FIG. 8 shows the results of the measurement of stiction after running for 1,000 hr. for a magnetic disk device assembled with each of the above described bearings lubricated with the urea thickener grease NIGACE WS. In FIG. 8, the upper left measurement points indicate the stiction force for a group 81 with the prior art bearings, and the other measurement points indicate the stiction force for a group 82 representing measurements taken for a magnetic disk manufactured with the present bearings. The experimental results indicate that the stiction force group 81 with the prior art bearing consistently exceeds the allowable stiction force for the start of rotation of the magnetic disk device. However, the stiction force group 82 with the present bearing is below the allowable stiction force for the start of rotation (limit of magnetic disk starting torque) of the magnetic disk device. Therefore, the magnetic head crash caused by the floating gas generated by the lubricant for the bearings is prevented.

In the previously explained preferred embodiments, the bearings are disclosed to have rollers that are spherical ball bearings, but the present invention is not limited to such an extent. The invention also applies to slider bearings and roller bearings with cylindrical rollers and all other types of bearings that use grease in an environment that is affected by the generation of organic gases form the lubricant. Further the grease and the bearings in the preferred embodiment are not limited to the magnetic disk device but can be applied to other equipment that experiences the detrimental effects of the generated gas, for example, a rotational drive mechanism of magnetic disk (disk) manufacturing equipment, the rotational drive mechanism of the measuring tester for the floating space of the magnetic head, the rotational drive mechanism of an optical (magnetic) disk device, the rotational drive mechanism of servo track writing equipment which records the servo information on magnetic disks, the rotational drive mechanisms of the devices that use semiconductor integrated circuit technology and others.

The method of the heat and/or vacuum treatment is explained as the preferred embodiment for the method of manufacturing the grease to remove the slow evaporating substances, but the method of removing the slow evaporating substances is not limited to heat treatment since other methods such as chemical treatments are also applicable.

As is above described, by the present invention, the generation of the organic gas from the grease of the bearings is prevented by using the grease that comprises the fluid lubricant, the thickener and the additives, and from the fluid lubricant, the thickener and the additives, the slow evaporating substances of hydrocarbon compounds with carbons of C9 to C13 are significantly reduced or removed to a level of less than 0.001% by weight of the grease.

The method of manufacturing the bearings by the present invention provides bearings that prevent the generation of the organic gases from the grease by using the grease from which the slow evaporating substances of hydrocarbon compounds with carbons of C9 to C13 are significantly reduced or removed to a level of less than 0.001% by weight of the total weight of the grease.

The method of manufacturing the bearings can be achieved by heat treatment after assembling the bearings holding the rollers applied with the grease between the inner and outer rings. The heating is performed at a temperature of 60° to 100° C. to remove the slow evaporating substances at ambient temperature, or by reducing the ambient pressure to $10^{-6}$ torr for the heating at 60° to 80° C.

Further, a magnetic disk device of the present invention can be manufactured by using bearings lubricated with the grease having the slow evaporating substances of the hydrocarbon compounds with carbons of C9 to C13 significantly reduced or removed to a level of less than 0.001% by weight of the total weight of the grease. Such bearings are used in the spindle of a magnetic disk device that supports and rotates the magnetic disk and for the actuator that moves the magnetic head across the surface of the magnetic disk. Since the generation of the organic gases from the grease is prevented, magnetic head crash by the adhesion of the gas to the magnetic head and the magnetic head slider which causes stiction is prevented.

We claim:

1. A bearing having inner and outer rings and rollers disposed between said rings so that the outer ring rotates freely with respect to the inner ring, comprising:

a grease for lubricating said rollers, said grease including a liquid lubricant, a thickener and at least one additive, wherein slow evaporating substances of hydrocarbon compounds with carbons of C9 to C13 in said grease are not more than 0.001 wt. % of the grease, wherein said bearing is a spindle bearing for supporting at least one magnetic disk in a magnetic disk drive.

2. A bearing having inner and outer rings and rollers disposed between said rings so that the outer ring rotates freely with respect to the inner ring, comprising:

a grease for lubricating said rollers, said grease including a liquid lubricant, a thickener and at least one additive, wherein slow evaporating substances of hydrocarbon compounds with carbons of C9 to C13 in said grease are not more than 0.001 wt. % of the grease, wherein said bearing is a pivot bearing for supporting a pivoting actuator in a magnetic disk drive.

3. A method of manufacturing a bearing having inner and outer rings and rollers disposed between said rings so that the outer ring rotates freely with respect to the inner ring, comprising:

assembling the inner and outer rings with the rollers;

lubricating the bearing with a grease, said grease including a liquid lubricant, a thickener and at least one additive;

after the assembling and lubricating steps, heat treating the bearing at a temperature of 60° to 100° C. so that the slow evaporating substances of hydrocarbon compounds with carbons of C9 to C13 in said grease are reduced to not more than 0.001 wt. % of the grease.

4. A method of manufacturing a bearing having inner and outer rings and rollers disposed between said rings so that the outer ring rotates freely with respect to the inner ring, comprising:

assembling the inner and outer rings with the rollers;

lubricating the bearing with a grease, said grease including a liquid lubricant, a thickener and at least one additive;

after the assembling and lubricating steps, heat treating the bearing at a temperature of 60° to 100° C. at a pressure of $10^{-3}$ to $10^{-8}$ torr so that the slow evaporating substances of hydrocarbon compounds with carbons of C9 to C13 in said grease are reduced to not more than 0.001 wt. % of the grease.

5. A magnetic disc device having a rotating spindle that holds at least one magnetic disk and a pivoting actuator that supports the magnetic heads for movement over the surface of the at least one magnetic disk, comprising:

spindle bearings for said rotating spindle and a pivot bearing for said actuator;

a grease for lubricating the bearings, said grease including a liquid lubricant, a thickener and at least one additive, wherein slow evaporating substances of hydrocarbon compounds with carbons of C9 to C13 in said grease are not more than 0.001 wt. % of the grease.

6. A method of manufacturing a magnetic disk device having a pivot bearing for an actuator and a spindle bearing for supporting at least one magnetic disk in rotation, comprising:

lubricating the bearings with a grease, said grease including a liquid lubricant, a thickener and at least one additive;

assembling the bearings in the magnetic disk device; and after the assembling and lubricating steps, heat treating the bearings at a temperature of 60° to 100° C. at a pressure of $10^{-3}$ to $10^{-8}$ torr so that the slow evaporating substances of hydrocarbon compounds with carbons of C9 to C13 in said grease are reduced to not more than 0.001 wt. % of the grease.

7. A lubricated bearing for a device in which substances caused by evaporation of the lubricated bearing during operation of the bearing at a temperature range of 60°–100° C. affects a head-disk interface, comprising:

a grease for lubricating said bearing, said grease including a liquid lubricant, a thickener and at least one additive, wherein slow evaporating substances of hydrocarbon compounds with carbons of C9 to C13 in said grease are not more than 0.001 wt. % of the grease.

8. A magnetic disc device having at least one bearing lubricated by a grease having a liquid lubricant, a thickener and at least one additive, wherein slow evaporating substances of hydrocarbon compounds with carbons of C9 to C13 in said grease are removed to be less than 0.001 wt. % of the grease by heat treating the bearing at a temperature of 60° to 100° C. at a pressure of $10^{-3}$ to $10^{-8}$ torr.

* * * * *